March 15, 1932. F. R. McCRUDDEN 1,849,406
HELICAL SPRING WASHER
Filed Aug. 12, 1931
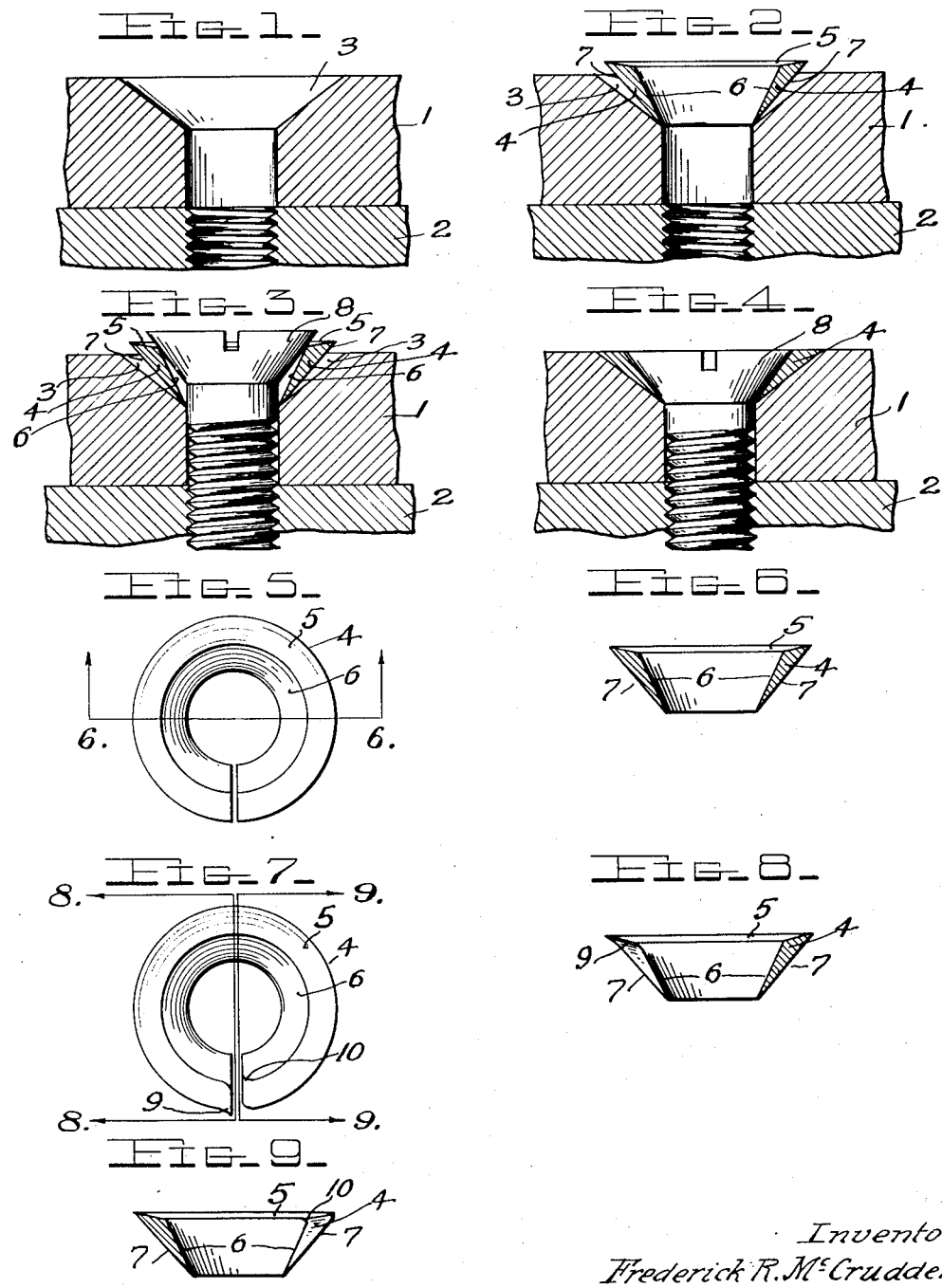
Inventor
Frederick R. McCrudden
by
Attorney Patented Mar. 15, 1932

1,849,406

UNITED STATES PATENT OFFICE

FREDERICK R. McCRUDDEN, OF MOORESTOWN, NEW JERSEY, ASSIGNOR TO NATIONAL LOCK WASHER COMPANY, OF NEWARK, NEW JERSEY, A CORPORATION OF NEW JERSEY

HELICAL SPRING WASHER

Application filed August 12, 1931. Serial No. 556,688.

This invention relates to plain spring washers, and has for its object to provide a washer that is so formed that it may be positioned within a beveled countersink and then forced by a bevel headed screw firmly in contact both with the screw and the wall of the countersink.

In the accompanying drawings

Figures 1, 2, 3 and 4, are sectional elevations showing respectively the parts to be secured together, the preliminary assembly of such parts and washer, the similar assembly with the addition of the screw, and the final position of all parts when the screw is fully driven home—

Figure 5 is a plan view of one form of the washer—

Figure 6 is a section at the line 6—6 of Figure 5—

Figure 7 is a plan view of a slightly modified form of the washer—

Figure 8 is a section at the line 8—8 of Figure 7, and

Figure 9 is a section at the line 9—9 of Figure 7.

Similar numerals of reference will be used to denote like parts in the several figures of the drawings.

1, 2, represent the parts to be secured one to the other, both parts being bored for machine screws, the part 1 having a beveled countersink 3 leading down to its bore.

At this point it is deemed proper to state that wood screws may be used, if the occasion will permit, since the bores and the nature of the screw are immaterial.

4 denotes the washer, whose upper face is slightly dished inwardly, as shown at 5, for the purpose presently to be explained, and whose inner and outer edges 6 and 7 taper downwardly toward each other.

The washer is a plain divided inverted frustrum-like ring which is resilient when spread, and, when initially positioned within the countersink 3, is spaced from the wall of the latter, as clearly shown at Figure 2.

8 is a bevel head screw inserted within the washer and the bores of the parts 1 and 2, and, when the parts are assembled in this manner they will appear as is shown at Figure 3, and it will be noted that the outer and inner edges of the washer are not parallel to the wall of the countersink, and that the bevel of the screw head is not parallel to the inner edge of the washer.

As the screw is driven home, its beveled head will cause the washer to spread until finally the outer and inner edges of the latter will be in close contact respectively with the wall of the countersink and the beveled screw head, as is shown at Figure 4. The upper face of the washer is dished so that it will finally be flush with the top of the part 1 and also the top of the screw.

It will therefore be evident that the inclines of the outer and inner edges of the washer are predetermined with respect to the inclines of the countersink and beveled screw head, and that the washer is triangular in cross section.

Referring to Figure 7, the top of the washer may be bent outwardly at one end as shown at 9 and inwardly at the other end as shown at 10, so that these bent portions may dig respectively into the wall of the countersink and the bevel of the screw head, thus affording an additional security so far as accidental relaxation of the screw is concerned.

What is claimed is:—

1. A plain divided spring washer of an inverted frustrum-like shape adapted to be positioned within an inclined countersink in a part to be secured, said washer primarily being spaced from the wall of said countersink, and adapted to cooperate with a bevel head screw passed within said washer and driven against the latter to cause it to spread and contact with said wall and head.

2. A construction as in claim 1 with the addition that the outer and inner edges of the washer are so tapered that before expansion of the washer they are not parallel to the wall of the countersink.

3. A construction as in claim 1, further distinguished in that the upper face of the washer is dished inwardly.

4. A construction as in claim 1, still further distinguished in that the ends of the washer at the top are bent in opposite directions.

In testimony whereof I affix my signature hereto.

FREDERICK R. McCRUDDEN.